US011680118B2

(12) United States Patent
Wang et al.

(10) Patent No.: US 11,680,118 B2
(45) Date of Patent: Jun. 20, 2023

(54) $C_2C_3$ RANDOM COPOLYMER COMPOSITION

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Cornelia Tranninger, Linz (AT)

(73) Assignee: Borealis AG, Vienna (AT)

( * ) Notice: Subject to any disclaimer, the term of this patent is extended or adjusted under 35 U.S.C. 154(b) by 249 days.

(21) Appl. No.: 17/056,298

(22) PCT Filed: Jun. 25, 2019

(86) PCT No.: PCT/EP2019/066867
§ 371 (c)(1),
(2) Date: Nov. 17, 2020

(87) PCT Pub. No.: WO2020/002349
PCT Pub. Date: Jan. 2, 2020

(65) Prior Publication Data
US 2021/0214478 A1    Jul. 15, 2021

(30) Foreign Application Priority Data
Jun. 29, 2018 (EP) .................................... 18180768

(51) Int. Cl.
| | | |
|---|---|---|
| *C08F 210/16* | (2006.01) | |
| *C08F 2/00* | (2006.01) | |
| *C08F 4/76* | (2006.01) | |
| *C08F 4/659* | (2006.01) | |
| *C08L 23/16* | (2006.01) | |
| *C08F 210/06* | (2006.01) | |
| *C08F 4/6592* | (2006.01) | |
| *C08K 5/00* | (2006.01) | |
| *C08L 23/08* | (2006.01) | |
| *C08L 23/14* | (2006.01) | |

(52) U.S. Cl.
CPC ............ *C08F 210/06* (2013.01); *C08F 2/001* (2013.01); *C08F 4/65912* (2013.01); *C08F 4/65927* (2013.01); *C08K 5/005* (2013.01); *C08L 23/0815* (2013.01); *C08L 23/14* (2013.01); *C08L 23/16* (2013.01); *C08L 2201/10* (2013.01); *C08L 2203/02* (2013.01); *C08L 2203/162* (2013.01); *C08L 2203/30* (2013.01); *C08L 2205/02* (2013.01); *C08L 2314/06* (2013.01)

(58) Field of Classification Search
CPC ........ C08F 210/16; C08F 10/06; C08F 2/001; C08F 2500/27; C08F 2500/34; C08F 2500/12; C08L 23/16; C08L 2201/10; C08L 2203/16; C08L 2203/162; C08L 2205/02; C08L 2205/025
See application file for complete search history.

(56) References Cited

U.S. PATENT DOCUMENTS

| | | | |
|---|---|---|---|
| 7,217,767 B2 | 5/2007 | Aguirre et al. | |
| 9,273,201 B2 * | 3/2016 | Reichelt | C09D 123/142 |
| 9,676,883 B2 * | 6/2017 | Piemontesi | C08F 210/06 |
| 9,932,468 B2 * | 4/2018 | Tranninger | C08J 5/18 |
| 2017/0158788 A1 * | 6/2017 | Wang | C08L 23/142 |

FOREIGN PATENT DOCUMENTS

| | | | |
|---|---|---|---|
| CN | 103298875 | 9/2013 | |
| CN | 105189577 | 12/2015 | |
| CN | 106898250 A | 6/2017 | |
| CN | 107109006 | 8/2017 | |
| CN | 107250177 | 10/2017 | |
| EP | 0887379 A1 | 12/1998 | |
| EP | 2361950 A1 * | 8/2011 | ............ C08L 23/10 |
| EP | 2527594 A1 * | 11/2012 | ............ F01D 5/02 |
| EP | 2808352 A1 | 12/2014 | |
| EP | 2965908 A1 | 1/2016 | |
| EP | 3031849 A1 | 6/2016 | |
| EP | 3064514 A1 | 9/2016 | |
| JP | 2003-73426 A * | 3/2003 | ............ C08F 210/16 |
| JP | 2003073426 A | 3/2003 | |
| RU | 2334766 C2 | 9/2008 | |
| WO | 3212182 A1 | 7/1992 | |
| WO | 9924478 A1 | 5/1999 | |
| WO | 9924479 A1 | 5/1999 | |
| WO | 0068315 A1 | 11/2000 | |
| WO | 2004000899 A1 | 12/2003 | |
| WO | 2004111095 A1 | 12/2004 | |
| WO | 2006116472 A2 | 11/2006 | |
| WO | 2010052260 A1 | 5/2010 | |
| WO | 2010052263 A1 | 5/2010 | |
| WO | 2010052264 A1 | 5/2010 | |
| WO | 2013007650 A1 | 1/2013 | |
| WO | 2015011135 A1 | 1/2015 | |
| WO | 2015169831 A1 | 11/2015 | |
| WO | WO 2015/169831 A1 * | 11/2015 | ............ C08F 110/06 |
| WO | WO 2016/162359 A1 * | 10/2016 | ............ C08L 23/14 |
| WO | 2017016711 A1 | 2/2017 | |
| WO | WO 2020/239561 A1 * | 12/2020 | ............ C08F 210/16 |

OTHER PUBLICATIONS

JP 2003-73426 (Mar. 12, 2003); machine translation. (Year: 2003).*
International Search Report for PCT/EP2019/066867 dated Sep. 4, 2019, 11 pages.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.

(Continued)

Primary Examiner — Rip A Lee
(74) Attorney, Agent, or Firm — Lowenstein Sandler LLP

(57) ABSTRACT

New C2C3 random copolymer composition, which shows improved sealing behaviour due to low sealing initiation temperature (SIT) and high hot tack force. In addition, the inventive composition shows an excellent sterilization behaviour, i.e. retention of low haze level after sterilization. The present invention is furthermore related to the manufacture of said copolymer composition and to its use.

12 Claims, No Drawings

(56) References Cited

OTHER PUBLICATIONS

Kakugo, et al., "C NMR Determination of Monomer Sequence Distribution in Ethylene-Propylene Copolymers Prepared with s-TiCL13-AL (C2H5)2C1," Macromolecules, 1982, vol. 15, pp. 1150-1152.

Resconi, et al., "Selectivity in Propene Polymerization with Metallocene Catalysts," Chem. Rev., 2000, vol. 100, pp. 1253-1345.

Singh, et al., "Triad Sequence Determination of Ethylene-Propylene Copolymers—Application of Quantitative 13C NMR," Polymer Testing, 2009, vol. 29, pp. 475-479.

Wang, et al., "Structural Analysis of Ethylene/Propylene Copolymers Synthesized with a Constrained Geometry Catalyst," Macromolecules, 2000, vol. 33, pp. 1157-1162.

Zhou, et al., "A new decoupling method for accurate quantification of polyethylene copolymer composition and triad sequence distribution with 13C NMR," Journal of Magnetic Resonance, vol. 187, 2007, pp. 225-233.

Office Action for EP19732670.5 dated Nov. 11, 2021, 4 pages.

Examination Report for Indian Patent Application No. 202117000398 dated Mar. 26, 2021, 6 pages.

Office Action with English translation for Russian Patent Application No. 2020143493/04, dated Jun. 30, 2021, 16 pages.

Search Report with English translation for Russian Patent Application No. 2020143493/04, dated Jun. 28, 2021, 4 pages.

Sutyagin V.M. Bondaletova L.I. Chemistry and Physics of Polymers: Textbook. Tomsk: Publishing House TPU, 2003, 210 pages.

Tzvetkova "Metallocene Catalyst in Polymerization Processes of α-Olefins". High Molecular Weight Compounds. Series C, 2000, vol. 42, 11, UDK 541.64.547.313], p. 1955.

English Translation for Office Action for CN201980033568.4 dated Aug. 3, 2022, 24 pages.

Wang et al., "Study Progress of the Random Copolymer PP", China Plastics Industry, 2010, 5 pages.

Zhao et al., The Performance of Special Polypropylene Resin for Shrinkage Film with Low Sear Temperature, Beijangt Yanshan Petrochecmial High-Tech Co., Ltd., 2017, 3 pages.

\* cited by examiner

$C_2C_3$ RANDOM COPOLYMER COMPOSITION

CROSS-REFERENCE TO RELATED APPLICATION(S)

This application is a national phase of International Application No. PCT/EP2019/066867, filed on Jun. 25, 2019, which claims the benefit of European Patent Application No. 18180768.6, filed on Jun. 29, 2018. The contents of these applications are hereby incorporated by reference in their entirety.

FIELD OF THE INVENTION

The present invention is related to a new $C_2C_3$ random copolymer composition, which shows improved sealing behaviour due to low sealing initiation temperature (SIT) and high hot tack force. In addition, the inventive composition shows an excellent sterilization behaviour, i.e. retention of low haze level after sterilization. The present invention is furthermore related to the manufacture of said copolymer composition and to its use.

Polypropylenes are suitable for many applications.

For instance, polypropylene (PP) is applicable in areas where sealing properties play an important role, like in the food or medical packing industry, especially when a good combination of transparency and mechanical performance is desired. Such a combination is difficult to achieve if the material should be suitable for sealing layers of multi-layer films, which require a good balance between sealing initiation temperature (SIT) and hot tack force. A combination of lower SIT and higher hot tack force allows the converter to run the lines during the packaging step at higher speeds, but the overall performance of the film construction will only be satisfactory if the sealing layer is sufficiently flexible, tough and transparent.

To ensure fast sealing, a low SIT is of advantage. By operating at lower temperature there is the benefit that the article to be sealed is not exposed to high temperatures. There are also economical advantages, since lower temperatures are of course cheaper to generate and maintain.

There are further advantages in avoiding high sealing temperatures, especially when temperature sensitive goods are to be packed.

Furthermore, it is also desired to have a packaging material with satisfactory optical properties, such as low haze and/or high clarity.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120 to 130° C. Thus, the material should have a sufficient thermal stability, like a melting temperature higher than the usual steam sterilization temperature of about 120 to 130° C.

Of course, treatment of a polymer under the sterilization conditions outlined above can impair its final properties, especially the optical properties such as transparency.

Irrespective of the polymer type, a polymer must fulfil at best all desired end properties and additionally must be easily processable, i.e. it must withstand stress. However, end properties and processing properties act often in a conflicting manner.

It frequently turns out that improvement of one of the desired properties is achieved at the expense of at least one of the other properties.

Several attempts have been made to solve the above problem.

EP 3064514 B1, for example, discloses a C2C3 random copolymer composition for heat sealing comprising three polymer fractions (A), (B) and (C) with different comonomer content, whereby the composition is obtained in the presence of a metallocene catalyst.

Claimed are C2C3 random copolymer compositions comprising polymer fractions (A), (B) and (C), whereby, fraction (A) has a C2 content (C2 A) of 0.4 to 1.5 wt %, fraction (B) has a C2 content (C2 B) of 3.0 to 10.0 wt %, and fraction (C) has a C2 content (C2 C) of 7.0 to 15.0 wt %, whereby the comonomer content of the polymer fractions increases from fraction (A) to fraction (C) according to (C2 A)<(C2 B)<(C2 C), and whereby the composition is characterized by (i) a total C2 content in the range of 3.0-7.0 wt %, (ii) a melt flow rate MFR2 (230° C.) in the range of 2.0 to 15.0 g/10 min, (iii) a melting temperature Tm of from 128° C. to 145° C., (iv) a crystallization temperature Tc of from 85° C. to 110° C. and (v) a hexane solubles content determined in accordance with FDA section 177.1520 of at most 2.0 wt %.

Such compositions have a low sealing initiation temperature (SIT) but also low hot tack force. The key drawback of such compositions is the poor sterilization resistance, which results in a drastic increase in haze after sterilization.

EP 2965908 B1 discloses a PP random copolymer with ethylene, wherein (a) said propylene copolymer has a C2 content in the range of 5.3 to 9.0 wt %, a melting temperature Tm in the range of 128 to 138° C., and a xylene cold soluble fraction (XCS) in the range of 9.0 to 18.0 wt %. Said propylene copolymer comprises two fractions: a first propylene copolymer fraction (R-PP1) and a second propylene copolymer fraction (R-PP2) and said first propylene copolymer fraction (R-PP1) differs from said second propylene copolymer fraction (R-PP2) in the ethylene content.

Such compositions show already quite a good balance of SIT and hot tack force, but still poor sterilization resistance, which results in a drastic increase in haze after sterilization.

Therefore, there is still a need to design materials having improved sealing behaviour due to low sealing initiation temperature (SIT) and high hot tack force, and in addition having an excellent sterilization behaviour, i.e. retention of low haze level after sterilization.

The present invention is based on the finding that the above discussed needs for heat sealing applications, i.e. simultaneously having low sealing initiation temperature (SIT), high hot tack force and excellent sterilization behaviour, can be achieved by a specific design of a polyolefin composition.

Thus, according to a first aspect the present invention is directed to a C2C3 random copolymer composition comprising (A) 70.0 to 99.9 wt % of a C2C3 random copolymer having (a) an ethylene content in the range of from 2.0 to 4.8 wt %;

(b) a melt flow rate $MFR_2$ (230° C./2.16 kg) measured according to ISO 1133 in the range of from 4.0 to 12.0 g/10 min;

(c) a melting temperature Tm as determined by DSC according to ISO 11357 of from 120 to 135° C.;

(d) a xylene cold soluble (XCS) fraction below 10.0 wt % and (B) 0.0 to 30.0 wt % of an ethylene-α-olefin plastomer having a density in the range of 860 to 900 kg/m$^3$ and an MFR$_2$ (190° C./2.16 kg) measured according to ISO 1133 in the range of 0.5 to 50.0 g/10 min (C) one or more additives in a total amount of from 0.1 up to 5.0 wt %, based on the composition, selected from the group comprising slip agents, anti-block agents, UV stabilizers, antistatic agents, alpha-nucleating agents and antioxidants.

Preferably, the C2C3 random copolymer (A) comprises polymer fractions (A-1) and (A-2), and is obtainable, preferably obtained, in the presence of a metallocene catalyst.

In a further aspect the invention is related to monolayer films comprising the above defined $C_2C_3$ random copolymer composition, whereby the films are characterized by (i) a seal initiation temperature (SIT) (determined as described in the experimental part) of below 120° C., (ii) a hot-tack force determined (as described in the experimental part on 50 µm cast film) of above 1.0N, (iii) a haze (determined according to ASTM D1003-00 on cast film with a thickness of 50 µm) of below 5.0% and a haze (determined according to ASTM D 1003-00 measured on cast film with a thickness of 50 µm) after sterilization (steam sterilization at 121° C. for 30 min) of below 10.0% and (iv) a clarity (determined according to ASTM D1003-00 on cast film with a thickness of 50 µm) of at least 75.0% and a clarity (determined according to ASTM D1003-00 on cast film with a thickness of 50 µm) after sterilization (steam sterilization at 121° C. for 30 min) of at least 65.0%.

In a further aspect, the present invention is related to the use of the monolayerfilms according to the invention for lamination or mono- or multilayer films for packaging films and medical/hygienic films.

As alternative in one further aspect the present invention is related to the use of the monolayer films according to the invention as sealing layer in a polypropylene multi-layer film, which can be manufactured either by co-extrusion or lamination.

In the following, the invention is defined in more detail.

$C_2C_3$ Random Copolymer (A)

The $C_2C_3$ random copolymer composition according to the present invention comprises at least 70.0 wt % of C2C3 random copolymer (A).

The $C_2C_3$ random copolymer (A) used in the $C_2C_3$ random copolymer composition of the invention is a random copolymer of propylene and ethylene as comonomer.

The $C_2C_3$ random copolymer (A) is obtainable, preferably obtained, in the presence of a metallocene catalyst.

The $C_2C_3$ random copolymer (A) used in the $C_2C_3$ random copolymer composition according to this invention is featured by a moderate to low ethylene comonomer content.

Accordingly, the $C_2C_3$ random copolymer (A) has an ethylene content in the range of 2.0 to 4.8 wt %, preferably in the range of from 2.3 to 4.5 wt %, more preferably in the range of from 2.5 to 4.2 wt %, and still more preferably in the range of from 2.5 to 4.0 wt %.

The $C_2C_3$ random copolymer (A) has a melt flow rate MFR2 (230° C.) measured according to ISO 1133 in the range of from 4.0 to 12.0 g/10 min, preferably in the range of from 5.0 to 10.0 g/10 min, more preferably in the range of from 6.0 to 9.0 g/10 min and still more preferably in range of from 6.5 to 8.5 g/10 min.

Alternatively, the $C_2C_3$ random copolymer (A) can be defined by the xylene cold soluble (XCS) content measured according to ISO 16152. Accordingly, the $C_2C_3$ random copolymer (A) is preferably featured by a xylene cold soluble (XCS) content of below 10.0 wt %, like in the range of from 1.0 to below 10.0 wt %.

Preferably, the $C_2C_3$ random copolymer (A) has a xylene cold soluble (XCS) content in the range of from 1.5 to 8.0 wt % and more preferably in the range of 2.0 to below 6.5 wt %.

Alternatively, the $C_2C_3$ random copolymer (A) can be defined by the melting temperature (Tm) measured via DSC according to ISO 11357. Accordingly, the $C_2C_3$ random copolymer (A) has a melting temperature Tm in the range of from 120° C. to 135° C., preferably in the range of from 122° C. to 134° C., and more preferably in the range of from 125° C. to 133° C.

The $C_2C_3$ random copolymer (A) preferably has a flexural modulus as determined according to ISO 178 on injection moulded specimens of below 1000 MPa, preferably in the range of 500 to 900 MPa, more preferably in the range of 700 to 850 MPa.

The $C_2C_3$ random copolymer (A) is multimodal, like bimodal in view of the comonomer content and comprises, preferably consists of polymer fractions (A-1) and (A-2).

Thus, the $C_2C_3$ random copolymer (A) comprises 30.0 to 70.0 wt % of polymer fraction (A-1) having (i) an ethylene content in the range of from 1.5 to 3.5 wt % and (ii) a melt flow rate MFR2 (230° C./2.16 kg) measured according to ISO 1133 in the range of from 4.0 to 12.0 g/10 min and 70.0 to 30.0 wt % of polymer fraction (A-2) having (i) an ethylene content in the range of from 3.6 to 6.0 wt % and (ii) a melt flow rate MFR2 (230° C./2.16 kg) measured according to ISO 1133 in the range of from 4.0 to 12.0 g/10 min.

Preferably, the $C_2C_3$ random copolymer (A) comprises 50.0 to 70.0 wt % of polymer fraction (A-1) and 30.0 to 50.0 wt % of polymer fraction (A-2).

More preferably, the $C_2C_3$ random copolymer (A) comprises 55.0 to 65.0 wt % of polymer fraction (A-1) and 35.0 to 45.0 wt % of polymer fraction (A-2).

Polymer fraction (A-1) preferably has an ethylene content in the range of from 1.8 to 3.3 wt % and more preferably in the range of from 2.0 to 3.1 wt %.

The melt flow rate MFR2 (230° C./2.16 kg) measured according to ISO 1133 of polymer fraction (A-1) is preferably in the range of from 5.0 to 10.0 g/10 min.

Polymer fraction (A-2) preferably has an ethylene content in the range of from 3.7 to 5.5 wt % and more preferably in the range of from 3.8 to 5.3 wt %.

The melt flow rate MFR2 (230° C./2.16 kg) measured according to ISO 1133 of polymer fraction (A-2) is preferably in the range of from 5.0 to 10.0 g/10 min.

The $C_2C_3$ random copolymer (A) is therefore preferably prepared by polymerizing propylene and ethylene by a sequential polymerization process comprising at least two reactors connected in series in the presence of a metallocene catalyst.

Thus, the $C_2C_3$ random copolymer (A) is prepared in a sequential polymerization process comprising at least two polymerization reactors (R1) and (R2), whereby in the first polymerization reactor (R1) a first polymer fraction (A-1) is produced, which is subsequently transferred into the second polymerization reactor (R2). In the second polymerization reactor (R2), a second polymer fraction (A-2) is then produced in the presence of the first polymer fraction (A-1).

Polymerization processes which are suitable for producing the $C_2C_3$ random copolymer (A) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the $C_2C_3$ random copolymer (A) is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by *Borealis* (known as BORSTAR@ technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the $C_2C_3$ random copolymer composition as defined above the conditions for the first reactor (R-1), i.e. the slurry reactor (SR), like a loop reactor (LR), of step (a) may be as follows:
the temperature is within the range of 40° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor (R-1) is transferred to the second reactor (R-2), i.e. gas phase reactor (GPR-1), where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

Preferably, the $C_2C_3$ random copolymer (A) according to this invention is produced in the presence of a metallocene catalyst.

Thus, the $C_2C_3$ random copolymer (A) is produced by a process comprising the following steps:

a) polymerizing in a first reactor propylene and ethylene, obtaining polymer fraction (A-1) of the $C_2C_3$ random copolymer (A),
b) transferring said polymer fraction (A-1) and unreacted comonomers of the first reactor in a second reactor (R-2),
c) feeding to said second reactor (R-2) propylene and ethylene,
d) polymerizing in said second reactor (R-2) and in the presence of said polymer fraction (A-1) propylene and ethylene obtaining polymer fraction (A-2)
said polymer fraction (A-1) and said polymer fraction (A-2) form the $C_2C_3$ random copolymer (A) as defined above,
whereby the polymerization takes place in the presence of a metallocene catalyst comprising
(a) a complex of formula (I):

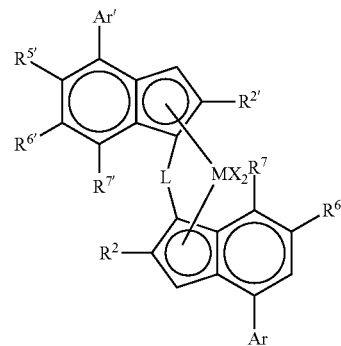

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—,
wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16; wherein $R^{6'}$ is preferably a tertiary alkyl group
$R^7$ is hydrogen or $C_{1-20}$ hydrocarbyl group optionally containing one or more heteroatoms from groups 14-16;
$R^{7'}$ is hydrogen;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each R⁴ is a $C_{1-20}$ hydrocarbyl group;
and (ii) a cocatalyst comprising at least one or two compounds of a group 13 metal, e.g. Al and/or boron compound.

Ad Catalyst:

The catalyst used in the process of the invention is in solid particulate form. As mentioned above it can be supported on a conventional carrier know to an art skilled person. Preferably, the used catalyst is free from an external carrier.

Ideally, the catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

The term $C_{1-20}$ hydrocarbyl group includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described in WO2013/007650, which is incorporated herein by reference. Thus, preferred complexes of use in the invention are of formula (II') or (II)

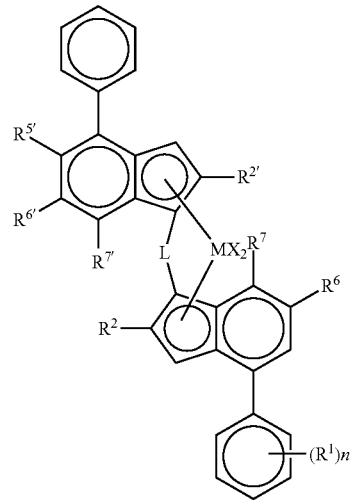

(II)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'₂C—, —R'₂C—CR'₂—, —R'₂Si—, —R'₂Si—SiR'₂—, —R'₂Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;
each R² or R²' is a $C_{1-10}$ alkyl group;
R' is a $C_{1-10}$ alkyl group or Z'R³' group;
R⁶ is hydrogen or a $C_{1-10}$ alkyl group;
R⁶' is a $C_{1-10}$ alkyl group or $C_{6-10}$ aryl group; preferably a tertiary alkyl group;
R⁷ is hydrogen, a $C_{1-6}$ alkyl group or ZR³ group;
R⁷' is hydrogen;
Z and Z' are independently O or S;
R³' is a $C_{1-10}$ alkyl group, or a $C_{6-10}$ aryl group optionally substituted by one or more halo groups;
R³ is a $C_{1-10}$-alkyl group;
each n is independently 0 to 4, e.g. 0, 1 or 2;
and each R¹ is independently a $C_{1-20}$ hydrocarbyl group, e.g. $C_{1-10}$ alkyl group.

Further preferred complexes of use in the invention are of formula (III') or (III):

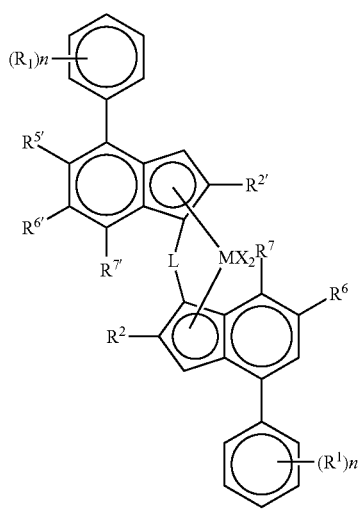

(II')

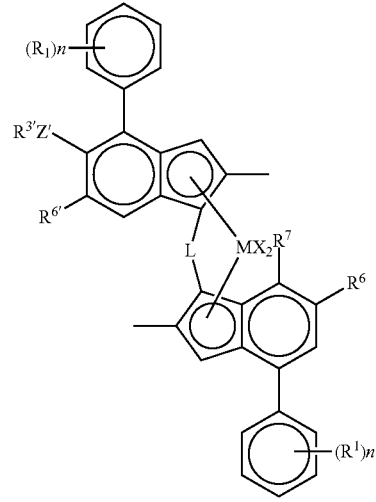

(III')

(III)

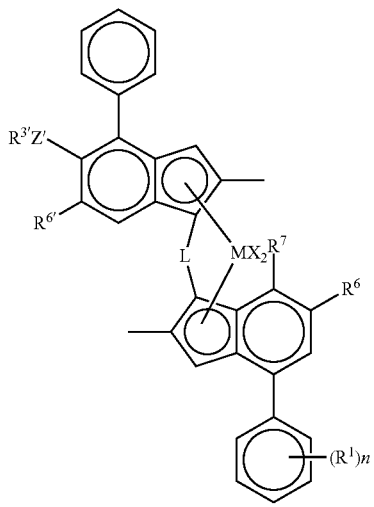

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

(IV)

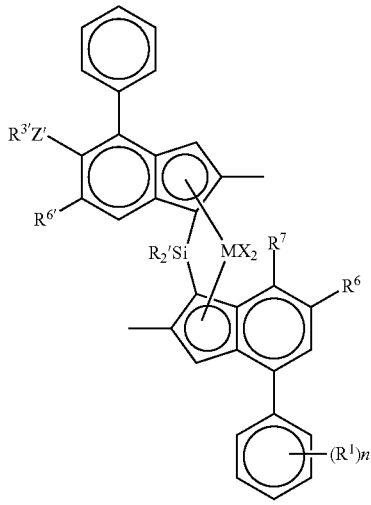

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group, preferably a tertiary alkyl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

(IV')

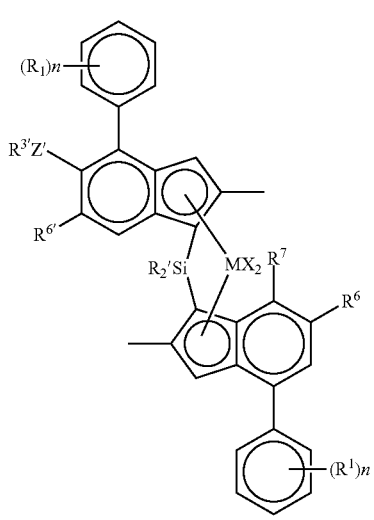

(V')

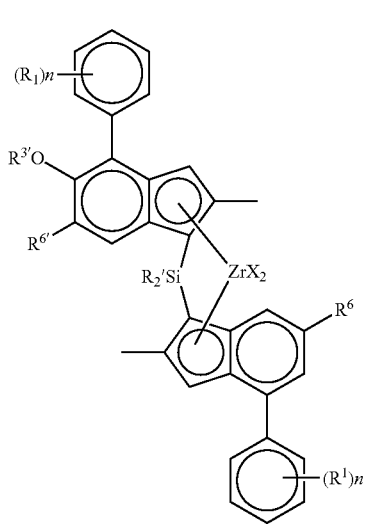

-continued

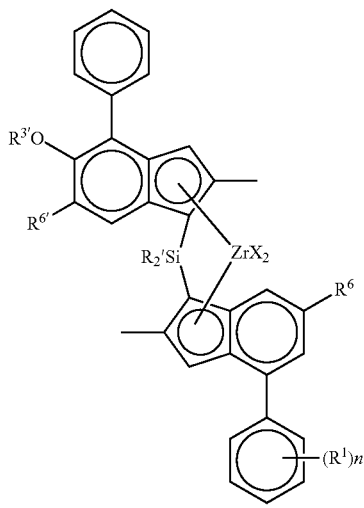

(V)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

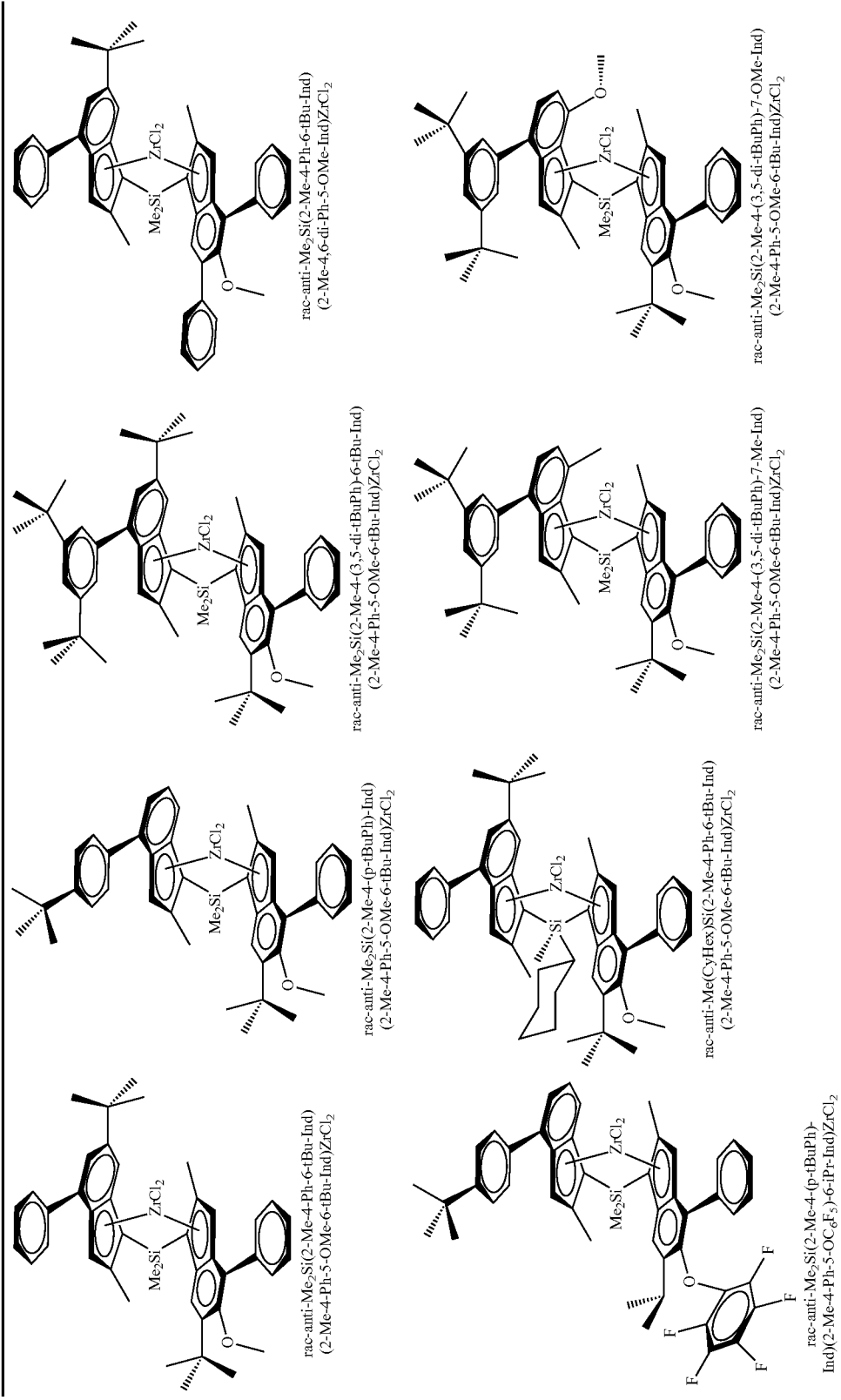

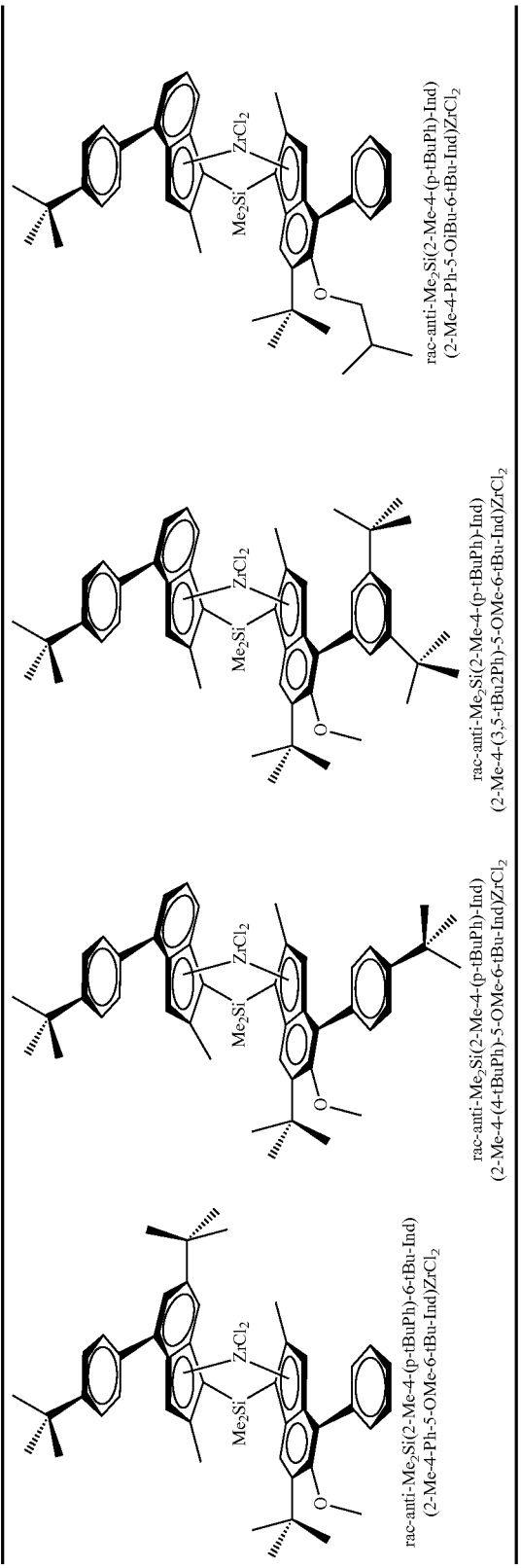

Most preferably rac-anti-Me$_2$Si(2-Me-4-(p-tBuPh)-Ind)(2-Me-4-Ph-5-OMe-6-tBu-nd)ZrCl$_2$ is used.

The synthesis of these materials is described in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates or combinations therefrom used to activate metallocene catalysts are suitable for use in this invention. Thus, the cocatalyst is preferably an alumoxane, like MAO. As an alternative borate cocatalysts can also be employed. It is also possible to use a combination of an alumoxane and a borate cocatalyst.

As borate cocatalyst, the use of B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ or Ni(CN)$_4$[B(CeF$_5$)$_3$]$_4^{2-}$ is especially preferred.

Further suitable cocatalysts are described in WO2013/007650.

Suitable amounts of cocatalyst will be well known to the person skilled in the art and are for example disclosed in WO2015/11135.

Manufacture

The catalyst used to manufacture the C$_2$C$_3$ random copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization, which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable C$_2$-C$_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexane are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst prepolymerization is done in fluorinated hydrocarbons, the temperature for the prepolymerization step is below 70° C., e.g. in the range of −30 to 70° C., preferably 0-65° C. and more preferably in the range 20 to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere.

Prepolymeriztaion is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

Ethylene-α-Olefin Plastomer

The C$_2$C$_3$ random copolymer composition can further comprise component (B), which is an ethylene-α-olefin plastomer.

Component (B) can be present in an amount of from 0.0 to 30.0 wt %, based on the total weight of the composition, preferably in an amount of from 0.0 to 27.0 wt %.

The optional ethylene-α-olefin plastomer has a density in the range of from 860 to 900 kg/m$^3$, preferably in the range of from 865 to 895 kg/m$^3$ and more preferably in the range of from 870 to 890 kg/m$^3$.

The MFR$_2$ (190° C./2.16 kg) measured according to ISO 1133 of the optional ethylene-α-olefin plastomer is in the range of from 0.5 to 50.0 g/10 min, preferably in the range of from 0.8 to 45.0 g/10 min and more preferably in the range of from 1.0 to 35.0 g/10 min.

Suitable ethylene-based plastomers may have an ethylene content from 60.0 to 95.0 wt %, preferably from 65.0 to 90.0 wt % and more preferably from 70.0 to 88.0 wt %. The comonomer contribution preferably is up to 40.0 wt %, more preferably up to 35.0 wt %. The comonomer contents of conventional ethylene plastomers are familiar to the person skilled in the art.

The ethylene based plastomer is preferably a copolymer of ethylene and propylene or a $C_4$-$C_{10}$ alpha-olefin. Suitable $C_4$-$C_{10}$ alpha-olefins include 1-butene, 1-hexene and 1-octene, preferably 1-butene or 1-octene and more preferably 1-octene. Preferably copolymers of ethylene and 1-octene are used.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is from 33 to 115° C.

Furthermore suitable ethylene based plastomers may have a glass transition temperature Tg (measured by DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of from 1.5 to 5.0, more preferably in the range of from 2.0 to 4.5, even more preferably in the range of from 2.5 to 4.0. The ethylene based plastomer can be unimodal or multimodal, preferably unimodal. Preferably, the PE plastomer is a metallocene catalysed polymer although Ziegler-Natta based polyethylene plastomers are also possible.

Suitable ethylene based plastomers can be any copolymer of ethylene and propylene or ethylene and $C_4$-$C_{10}$ alpha olefin having the above defined properties, which are commercial available, i.a. from *Borealis* AG (AT) under the tradename Queo, from DOW Chemical Corp (USA) under the tradename Engage or Affinity, or from Mitsui under the tradename Tafmer. Alternatively, the ethylene based plastomer can be prepared by known processes, in a one stage ortwostagepolymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by a C1-4 alkyl group such as pentane, methyl pentane, hexane, heptane, octane, cyclohexane, methylcyclohexane and hydrogenated naphtha. More preferably unsubstituted C6-10-hydrocarbon solvents are used.

A known solution technology suitable for the process according to the invention is the Borceed technology.

It will be appreciated that the ethylene based plastomer may contain standard polymer additives.

Additives

The inventive $C_2C_3$ random copolymer composition comprises as component (C) one or more additives in a total amount of from 0.1 up to 5.0 wt %, based on the composition, selected from the group comprising slip agents, anti-block agents, UV stabilizers, antistatic agents, alpha-nucleating agents and antioxidants.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0)

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81)

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component.

Preferably at least an antioxidant is added.

Preparation of $C_2C_3$ Random Copolymer Composition

The process for producing the $C_2C_3$ random copolymer composition as described above comprises the steps of (i) preparing the $C_2C_3$ random copolymer (A) by polymerizing propylene and ethylene by a sequential polymerization process comprising at least two reactors connected in series in the presence of a metallocene catalyst, (ii) optionally mixing said $C_2C_3$ random copolymer (A) with an ethylene-α-olefin plastomer (B), (iii) adding one or more additives (C), to obtain a mixture of (A), optional (B) and (C) and (iii) extruding said mixture to obtain the $C_2C_3$ random copolymer composition.

Step (i) is described above.

Article

The present invention is not only related to the composition itself, but also to its use and to articles comprising the inventive $C_2C_3$ random copolymer composition.

The $C_2C_3$ random copolymer composition of this invention can be further converted to an end product, i.e. an article, by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably, articles are packaging containers made by injection moulding, blow moulding or thermoforming, or packaging films made by film extrusion.

The $C_2C_3$ random copolymer composition of the present invention is therefore suitable for the preparation of a variety of articles, like films (cast and blown film) for flexible packaging systems, such as bags or pouches for food and pharmaceutical packaging or medical articles in general as well as moulded articles.

Articles comprising the $C_2C_3$ random copolymer composition of the present invention have sufficient thermal stability to enable sterilization treatment.

Therefore, the present invention is also directed to a sterilizable or sterilized article, preferably to a sterilizable or sterilized film, like a sterilizable or sterilized cast or blown film.

Such films can be subjected to a steam sterilization treatment in a temperature range of about 120° C. to 130° C.

In an embodiment, the present invention is related to an article, the article being an unoriented mono-layer film comprising the inventive $C_2C_3$ random copolymer composition. Accordingly the present invention is also directed to an article, the article being an unoriented mono-layer film, like cast film or blown film, e.g. air cooled blown film, comprising at least 90 wt %, preferably comprising at least 95 wt %, yet more preferably comprising at least 99 wt %, of the instant $C_2C_3$ random copolymer composition.

The above described composition is suitable for the production of blown films as well as cast films. Preferred films are cast films.

Mono-layer films having a thickness of 5 to 300 μm, preferably 10 to 200 μm, more preferably 20 to 150 μm are suitable according to the present invention.

Films, preferably cast films, comprising the inventive $C_2C_3$ random copolymer composition have beneficial properties (i) to (iv):

(i) The films have a seal initiation temperature (SIT) (determined on 50 μm cast film as described in the experimental part) of below 120° C.

Preferably, the films have a sealing initiation temperature (SIT) in the range of from 80 to 115° C., more preferably in the range of from 85 to less than 112° C., like in the range of from 90 to less than 111° C.

The low SIT of such a film is combined with (ii) a high hot tack force determined on 50 μm cast film (as described in the experimental part) of above 1.0N.

Preferably, the films have a high hot tack force in the range of from 1.05 to 5.0N, more preferably in the range of from 1.05 to 4.5N.

The films have (iii) a haze (determined according to ASTM D 1003-00 on 50 μm cast film) of below 5.0%, preferably of below 4.5%, and more preferably of below 4.0%.

The films furthermore have a haze value (determined according to ASTM D 1003-00 on 50 μm cast film) after steam sterilization at 121° C. for 30 min of below 10.0%, preferably of below 8.0%, and more preferably of below 7.0%.

In addition, the films have (iv) a clarity (determined according to ASTM D1003-00 on cast films with a thickness of 50 μm) of at least 75.0%, preferably of at least 80.0% and more preferably of at least 82.0%.

The clarity (determined according to ASTM D1003-00 on cast films with a thickness of 50 μm) after sterilization (steam sterilization at 121° C. for 30 min) is at least 65.0%, preferably of at least 70.0% and more preferably of at least 75.0%.

Furthermore such films comprising the inventive $C_2C_3$ random copolymer (A) shall preferably have a tensile modulus determined according to ISO 527-3 at 23° C. on cast films with a thickness of 50 μm in machine direction as well as in transverse direction in the range of 200 to 500 MPa, more preferably in the range of 250 to 450 MPa, like in the range of 300 to 480 MPa.

A multi-layer film construction comprising at least one layer comprising the inventive $C_2C_3$ random copolymer is preferably produced by multi-layer co-extrusion followed by film casting or film blowing. In this case, at least one of the outermost layers of said multi-layer film construction serving as sealing layer(s) shall comprise the inventive $C_2C_3$ random copolymer as defined above. The inventive multi-layer film construction shall preferably have a thickness in the range of 30 to 500 μm, more preferably in the range of 50 to 400 μm, like in the range of 60 to 300 μm. The sealing layer(s) comprising the inventive $C_2C_3$ random copolymer shall preferably have a thickness in the range of 3 to 50 μm, more preferably in the range of 5 to 30 μm, like in the range of 8 to 25 μm.

Films and/or multi-layer film constructions according to the present invention shall preferably be used for flexible packaging systems, such as bags or pouches for food and pharmaceutical packaging or medical articles in general.

Measuring Methods

Calculation of comonomer content of the second polymer fraction (A-2):

$$\frac{C(A) - w(A1) \times C(A1)}{w(A2)} = C(A2) \quad (I)$$

Wherein w(A-1) is the weight fraction [in wt %] of the first polymer fraction (A-1), w(A-2) is the weight fraction [in wt %] of second polymer fraction (A-2), C(A-1) is the comonomer content [in wt %] of the first polymer fraction (A-1), C(A) is the comonomer content [in wt %] of the $C_2C_3$ random copolymer (A), C(A-2) is the calculated comonomer content [in wt %] of the second polymer fraction (A-2).

Calculation of melt flow rate $MFR_2$ (230° C.) of the polymer fraction (A-2):

$$MFR(A2) = 10^{\left[\frac{\log(MFR(A)) - w(A1) \times \log(MFR(A1))}{w(A2)}\right]} \quad (II)$$

wherein w(A1) is the weight fraction [in wt %] of the polymer fraction A-1 w(A2) is the weight fraction [in wt %] of the polymer fraction A-2,

MFR(A1) is the melt flow rate $MFR_2$ (230° C.) [in g/10 min] of the polymer fraction A-1, MFR(A) is the melt flow rate $MFR_2$ (230° C.) [in g/10 min] of the $C_2C_3$ random copolymer (A), MFR(A2) is the calculated melt flow rate $MFR_2$ (230° C.) [g/10 min] of the polymer fraction A-2.

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E = 0.5(S\beta\beta + S\beta\gamma + S\beta\delta + 0.5(S\alpha\beta + S\alpha\gamma))$ Through the use of this set of sites the corresponding integral equation becomes:

$E = 0.5(I_H + I_G + 0.5(I_C + I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$E[\text{mol \%}] = 100 * fE$

The weight percent comonomer incorporation was calculated from the mole fraction:

$E[\text{wt \%}] = 100 * (fE * 28.06) / ((fE * 28.06) + ((1 - fE) * 42.08))$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene solubles (XCS, wt %):

Content of xylene cold solubles (XCS) is determined at 25° C. according ISO 16152; first edition; 2005

DSC Analysis, Melting Temperature ($T_m$) and Crystallization Temperature ($T_c$): measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C.

Crystallization temperature ($T_c$) and crystallization enthalpy ($H_c$) are determined from the cooling step, while melting temperature ($T_m$) and melting enthalpy ($H_m$) are determined from the second heating step.

Flexural modulus is determined according to ISO 178 on 80×10×4 mm³ test bars injection moulded in line with EN ISO 1873-2.

Tensile modulus in machine and transverse direction were determined according to ISO 527-3 at 23° C. on cast films of 50 μm thickness produced on a monolayer cast film line with a melt temperature of 220° C. and a chill roll temperature of 20° C. with a thickness of 50 μm produced as indicated below. Testing was performed at a cross head speed of 1 mm/min.

Transparency, haze and clarity were determined according to ASTM D1003-00 on cast films with a thickness of 50 μm produced as indicated below.

Sealing initiation temperature (SIT); (sealing end temperature (SET), sealing range): The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| | |
|---|---|
| Specimen width: | 25.4 mm |
| Seal Pressure: | 0.1 N/mm² |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature an sea strength (force) is determined at each step. The temperature is determined at which the seal strength reaches 3 N.

Hot Tack Force:

The hot-tack force was determined according to ASTM F1921-12—Method B on a J&B Hot-Tack Tester on a 50 μm thickness film produced on a monolayer cast film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions.

Film Specimen width: 25.4 mm.

Seal bar length: 50 mm; Seal bar width: 5 mm; Seal bar shape: flat

Seal Pressure: 0.3 N/mm²; Seal Time: 0.5 sec.

Cool time: 99 sec; Peel Speed: 200 mm/sec.

Start temperature: 90° C.; End temperature: 140° C.; Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

2. EXAMPLES

The catalyst used in the polymerization processes for the $C_2C_3$ random copolymer composition of the inventive example (IE1) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

For Comparative Examples CE1 and CE2 a Ziegler-Natta catalyst was used.

Preparation of the Ziegler-Natta Catalyst for CE1 and CE2

Used chemicals:

20% solution in toluene of butyl ethyl magnesium (Mg(Bu)(Et), BEM), provided by Chemtura 2-ethylhexanol, provided by Amphochem; 3-Butoxy-2-propanol-(DOWANOL™ PnB), provided by Dow; bis(2-ethylhexyl)citraconate, provided by SynphaBase TiCl4, provided by Millenium Chemicals; Toluene, provided by Aspokem Viscoplex® 1-254, provided by Evonik; Heptane, provided by Chevron Preparation of a Mg Alkoxy Compound Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 9° C. for 20 minutes followed by two heptane washes (30 kg, 15 min). During the first heptane wash the temperature was decreased to 50° C. and during the second wash to room temperature. The thus obtained catalyst was used along with triethyl-aluminium (TEAL) as co-catalyst and dicyclopentyl dimethoxy silane (D-Donor) as donor for preparing the polymers of CE1 and CE2.

The polymerization for preparing the inventive $C_2C^3$ random copolymer compositions as well as the polymers of CE1 and CE2 was performed in a Borstar pilot plant with a 2-reactor setup (loop-gas phase reactor (GPR 1))

TABLE 1 polymerization conditions for IE1, CE1 and CE2

|  | IE1 | CE1 | CE2 |
|---|---|---|---|
| Prepoly reactor |  |  |  |
| Temperature [° C.] | 20 | 30 | 30 |
| Pressure [Pa] | 5208 | 5469 | 5472 |
| Al/donor ratio [mol/mol] | — | 6 | 6 |
| Al/Ti ratio [mol/mol] | — | 165 | 163 |
| Residence time [h] | 0.3 | 0.4 | 0.4 |
| loop reactor |  |  |  |
| Temperature [° C.] | 70 | 65 | 65 |
| Pressure [Pa] | 5262 | 5425 | 5400 |
| Feed H2/C3 ratio [mol/kmol] | 0.4 | 0 | 0 |
| Feed C2/C3 ratio [mol/kmol] | 33.9 | 8 | 9 |
| Polymer Split [wt %] | 61 | 33 | 37 |
| MFR2 [g/10 min] (IE1: MFR of A-1) | 8.0 | 1.6 | 2.0 |
| Total C2 loop [wt %] (IE1: C2 of A-1) | 3.0 | 4.1 | 4.4 |
| GPR1 |  |  |  |
| Temperature [° C.] | 80 | 80 | 80 |
| Pressure [Pa] | 2400 | 2600 | 2550 |
| H2/C3 ratio [mol/kmol] | 3.9 | 6.5 | 6.0 |
| C2/C3 ratio [mol/kmol] | 152.3 | 35.6 | 39.3 |
| Polymer residence time (h) | 2.3 | 1.8 | 1.6 |
| Polymer Split [wt %] | 39 | 67 | 63 |
| Total MFR2 [g/10 min] | 7.0 | 1.6 | 1.4 |
| MFR2 [g/10 min] in GPR1 (IE1: MFR of A-2) | 5.6 | 1.6 | 1.1 |
| Total C2 [wt %] (loop + GPR1) | 3.5 | 5.4 | 6.0 |
| C2 in GPR1 [wt %] (IE1: C2 of A-2) | 4.2 | 6.0 | 7.0 |
| XCS [wt %] | 2.1 | 14.7 | 17.4 |
| Total productivity (kg PP/g cat) | 166 | 34 | 30 |

As CE3 inventive Example 1 (IE1) of EP3064514, a trimodal metallocene based copolymer composition, was used.

All polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

| Pellet | IE1 | CE1 | CE2 | CE3 |
|---|---|---|---|---|
| XCS [wt %] | 2.1 | 14.7 | 17.4 | 19.8 |
| Total C2 [wt %] | 3.5 | 5.4 | 6.0 | 4.6 |
| MFR2 [g/10 min] | 7.1 | 6.2 | 5.1 | 7.1 |
| Tm [° C.] | 133.1 | 139.5 | 137.3 | 136.7 |
| Tc [° C.] | 95.6 | 102.7 | 101.0 | 98.3 |

For Inventive Examples 2 to 4 the $C_2C_3$ random copolymer (A) produced as described above was mixed with an ethylene-α-olefin plastomer (B).

The following commercially available plastomers (B) have been used:

IE2: 10.0 wt % of Queo™ 8230, ethylene-octene plastomer, density 882 kg/m³, MFR₂ (190° C., 2.16 kg) 30 g/10 min and melting point 75° C., commercially available from *Borealis* AG IE3: 25.0 wt % of Queo™ 8230, ethylene-octene plastomer, density 882 kg/m³, MFR₂ (190° C., 2.16 kg) 30 g/10 min and melting point 75° C., commercially available from *Borealis* AG IE4: 10.0 wt % of Queo™ 8201, ethylene-octene plastomer, density 882 kg/m³, MFR₂ (190° C., 2.16 kg) 1.1 g/10 min and melting point 76° C., commercially available from *Borealis* AG Mixing was done in a co-rotating twin-screw extruder Coperion ZSK 57.

The inventive and comparative propylene compositions were converted to monolayer cast films with a thickness of 50 μm on a PM30 cast line (type laboratory extruder provided by Plastik Maschinenbau GmbH., Germany). The equipment consists of an extruder, chill roll with air knife and a winder.

A PP 3-zone screw with a diameter of 30 mm, 25 D length, 200 mm die, die gap 0.5 mm is applied in combination with a coat-hanger slit die assembly.

The extrusion parameters were as follows:

Extruder temperature profile: 220° C./240° C./250° C./260° C./260° C. (Melt temperature 250° C.; melt pressure 61 bar)

Extruder speed: 50 rpm

Chill roll temperature: 20° C.

take-off speed: 10.2 m/min

In Table 3 the optical parameters (before sterilization, b.s.) as well as the sealing performance, tensile modulus and hot tack force can be seen.

TABLE 3

Sealing performance, tensile and optics before sterilization (b.s.)

|  |  | IE1 | IE2 | IE3 | IE4 | CE1 | CE2 | CE3 |
|---|---|---|---|---|---|---|---|---|
| Tensile modulus (MD) | [MPa] | 429 | 392 | 327 | 395 | 349 | 326 | 351 |
| Tensile modulus (TD) | [MPa] | 437 | 403 | 334 | 402 | 348 | 330 | 365 |
| SIT | [° C.] | 109 | 106 | 94 | 105 | 114 | 109 | 107 |
| Hot-tack force | [N] | 3.91 | 1.09 | 1.67 | 1.37 | 1.68 | 2.41 | 1.99 |
| Haze b.s. | [%] | 0.22 | 0.34 | 2.29 | 2.4 | 0.35 | 0.31 | 2.1 |
| Clarity b.s. | [%] | 100 | 99.8 | 83.8 | 94.1 | 99.8 | 99.8 | 96.0 |

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

The optical parameters after sterilization (a.s.) can be seen in Table 4.

TABLE 4

Optics after sterilization (a.s.)

|  |  | IE1 | IE2 | IE3 | IE4 | CE1 | CE2 | CE3 |
|---|---|---|---|---|---|---|---|---|
| Haze (a.s.) | [%] | 0.92 | 1.38 | 5.96 | 4.42 | 17.3 | 18.2 | 19.1 |
| Clarity (a.s.) | [%] | 99.3 | 99.0 | 78.0 | 92.0 | 66.0 | 55.6 | 86.0 |

From the above tables it can be clearly seen that the inventive polypropylene compositions are characterised by an advantageous combination of low sealing initiation temperature (SIT), high hot-tack and good optical properties, like low haze and high clarity, whereby the optical parameters after sterilization are clearly better than for the comparative examples.

The invention claimed is:

1. A $C_2C_3$ random copolymer composition comprising
   (A) 70.0 to 99.9 wt % of a $C_2C_3$ random copolymer having
      (a) an ethylene content in a range of from 2.0 to 4.8 wt %;
      (b) a melt flow rate $MFR_2$ (230° C./2.16 kg) measured according to ISO 1133 in a range of from 4.0 to 12.0 g/10 min;
      (c) a melting temperature Tm as determined by DSC according to ISO 11357 of from 120 to 135° C.; and
      (d) a xylene cold soluble (XCS) fraction below 10.0 wt %;
   wherein the $C_2C_3$ random copolymer (A) comprises:
      30.0 to 70.0 wt % of polymer fraction (A-1) having
         (i) an ethylene content in the range of from 1.5 to 3.5 wt %, and
         (ii) a melt flow rate $MFR_2$ (230° C./2.16 kg) measured according to ISO 1133 in the range of 4.0 to 12.0 g/10 min and
      70.0 to 30.0 wt % of polymer fraction (A-2) having
         (i) an ethylene content in the range of from 3.6 to 6.0 wt % and
         (ii) a melt flow rate $MFR_2$ (230° C./2.16 kg) measured according to ISO 1133 in the range of from 4.0 to 12.0 g/10 min;
   (B) 0.0 to 30.0 wt % of an ethylene-α-olefin plastomer having a density in a range of from 860 to 900 kg/m³ and an $MFR_2$ (190° C./2.16 kg) measured according to ISO 1133 in a range of 0.5 to 50.0 g/10 min, and
   (C) one or more additives in a total amount of from 0.1 up to 5.0 wt %, based on the composition, comprising slip agents, anti-block agents, UV stabilizers, antistatic agents, alpha-nucleating agents and antioxidants.

2. The $C_2C_3$ random copolymer composition according to claim 1, wherein ethylene-α-olefin plastomer (B) is a copolymer of ethylene and a $C_4$-$C_{10}$ alpha olefin with a melting point in a range of from 33 to 115° C.

3. The $C_2C_3$ random copolymer composition according to claim 1, wherein the $C_2C_3$ random copolymer (A) is obtainable, preferably obtained in the presence of a metallocene catalyst.

4. A process comprising preparing articles with the $C_2C_3$ random copolymer composition according to claim 1.

5. A sterilizable or sterilized article comprising a $C_2C_3$ random copolymer composition comprising
   (A) 70.0 to 99.9 wt % of a $C_2C_3$ random copolymer having
      (a) an ethylene content in a range of from 2.0 to 4.8 wt %;
      (b) a melt flow rate $MFR_2$ (230° C./2.16 kg) measured according to ISO 1133 in a range of from 4.0 to 12.0 g/10 min;
      (c) a melting temperature Tm as determined by DSC according to ISO 11357 of from 120 to 135° C.; and
      (d) a xylene cold soluble (XCS) fraction below 10.0 wt %;
   (B) 0.0 to 30.0 wt % of an ethylene-α-olefin plastomer having a density in a range of from 860 to 900 kg/m³ and an $MFR_2$ (190° C./2.16 kg) measured according to ISO 1133 in a range of 0.5 to 50.0 g/10 min, and
   (C) one or more additives in a total amount of from 0.1 up to 5.0 wt %, based on the composition, comprising slip agents, anti-block agents, UV stabilizers, antistatic agents, alpha-nucleating agents and antioxidants,
   wherein the article is a film and the film is characterized by
      (i) a seal initiation temperature (SIT) of below 120° C.
      (ii) a hot-tack force (determined on 50 μm cast film) of above 1.0N
      (iii) a haze (determined according to ASTM D1003-00 on cast film with a thickness of 50 μm) of below 5.0% and a haze (determined according to ASTM D 1003-00 measured on a 50 μm cast film) after sterilization (steam sterilization at 121° C. for 30 min) of below 10.0% and
      (iv) a clarity (determined according to ASTM D1003-00 on cast film with a thickness of 50 μm) of at least 75.0% and a clarity (determined according to ASTM D1003-00 on cast films with a thickness of 50 μm) after sterilization (steam sterilization at 121° C. for 30 min) of at least 65.0%.

6. The sterilizable or sterilized articles according to claim 5, wherein the film has a tensile modulus (determined according to ISO 527-3 at 23° C. on cast film with a thickness of 50 μm) in machine direction as well as in transverse direction in a range of 200 to 500 MPa.

7. The sterilizable or sterilized article according to claim 5 prepared by cast film technology.

8. The sterilizable or sterilized article according to claim 5, wherein the film forms a sealing layer in a multi-layer film.

9. A multi-layer film, comprising the sterilizable or sterilized article according to claim 5 as a sealing layer.

10. Flexible packaging systems, selected from bags or pouches for food and pharmaceutical packaging comprising the sterilizable or sterilized article according to claim 5.

11. A process for producing a $C_2C_3$ random copolymer composition comprising
   (A) 70.0 to 99.9 wt % of a $C_2C_3$ random copolymer having
      (a) an ethylene content in a range of from 2.0 to 4.8 wt %;
      (b) a melt flow rate $MFR_2$ (230° C./2.16 kg) measured according to ISO 1133 in a range of from 4.0 to 12.0 g/10 min;
      (c) a melting temperature Tm as determined by DSC according to ISO 11357 of from 120 to 135° C.; and
      (d) a xylene cold soluble (XCS) fraction below 10.0 wt %;

(B) 0.0 to 30.0 wt % of an ethylene-α-olefin plastomer having a density in a range of from 860 to 900 kg/m³ and an MFR$_2$ (190° C./2.16 kg) measured according to ISO 1133 in a range of 0.5 to 50.0 g/10 min, and (C) one or more additives in a total amount of from 0.1 up to 5.0 wt %, based on the composition, comprising slip agents, anti-block agents, UV stabilizers, antistatic agents, alpha-nucleating agents and antioxidants, the process comprising the steps of (i) preparing the C$_2$C$_3$ random copolymer (A) by polymerizing propylene and ethylene by a sequential polymerization process comprising at least two reactors connected in series in the presence of a metallocene catalyst, (ii) optionally mixing said C$_2$C$_3$ random copolymer (A) with an ethylene-α-olefin plastomer (B), (iii) adding one or more additives (C), to obtain a mixture of (A), optionally (B) and (C), and (iv) extruding said mixture to obtain the C$_2$C$_3$ random copolymer composition.

12. The process for producing a C$_2$C$_3$ random copolymer composition according to claim 11, wherein step (i) comprises the following steps a) polymerizing into a first reactor propylene and ethylene, and obtaining polymer fraction (A-1) of the C$_2$C$_3$ random copolymer (A), b) transferring said polymer fraction (A-1) and unreacted comonomers of the first reactor in a second reactor (R-2), c) feeding to said second reactor (R-2) propylene and ethylene, d) polymerizing in said second reactor (R-2) and in the presence of said polymer fraction (A-1) propylene and ethylene obtaining polymer fraction (A-2), said polymer fraction (A-1) and said polymer fraction (A-2) form a C$_2$C$_3$ random copolymer (A) according to claim 1 comprising:

(A) 70.0 to 99.9 wt % of a C$_2$C$_3$ random copolymer having (a) an ethylene content in the range of from 2.0 to 4.8 wt %;

(b) a melt flow rate MFR$_2$ (230° C./2.16 kg) measured according to ISO 1133 in the range of from 4.0 to 12.0 g/10 min;

(c) a melting temperature Tm as determined by DSC according to ISO 11357 of from 120 to 135° C.; and (d) a xylene cold soluble (XCS) fraction below 10.0 wt %;

wherein the polymerizing takes place in the presence of a metallocene catalyst comprising (i) a complex of formula (I):

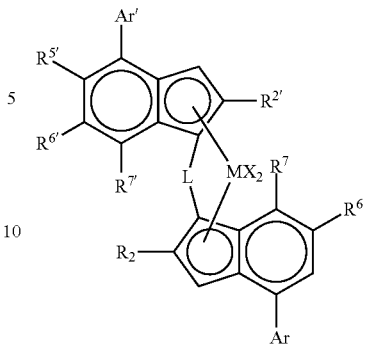

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, or —R'$_2$Ge—, wherein each R' is independently a hydrogen atom, C$_1$-C$_{20}$-hydrocarbyl, tri(C$_1$-C$_{20}$-alkyl)silyl, C$_6$-C$_{20}$-aryl, C$_7$-C$_{20}$-arylalkyl or C$_7$-C$_{20}$-alkylaryl;

$R^2$ and $R^{2'}$ are each independently a C$_1$-C$_{20}$ hydrocarbyl radical optionally containing one or more heteroatoms from groups 14-16;

$R^{5'}$ is a C$_{1-20}$ hydrocarbyl group containing one or more heteroatoms from groups 14-16 optionally substituted by one or more halo atoms;

$R^6$ and $R^{6'}$ are each independently hydrogen or a C$_{1-20}$ hydrocarbyl group optionally containing one or more heteroatoms from groups 14-16; wherein $R^6$ is preferably a tertiary alkyl group $R^7$ is hydrogen or C$_{1-20}$ hydrocarbyl group optionally containing one or more heteroatoms from groups 14-16;

$R^{7'}$ is hydrogen;

Ar is independently an aryl or heteroaryl group having up to 20 carbon atoms optionally substituted by one or more groups R';

Ar' is independently an aryl or heteroaryl group having up to 20 carbon atoms optionally substituted by one or more groups R';

each $R^1$ is a C$_{1-20}$ hydrocarbyl group or two $R^1$ groups on adjacent carbon atoms taken together may form a fused 5 or 6 membered non aromatic ring with the Ar group, said ring being itself optionally substituted with one or more groups $R^4$;

each $R^4$ is a C$_{1-20}$ hydrocarbyl group;

and (ii) a cocatalyst comprising at least one or two compounds of a group 13 metal.

* * * * *